US010543578B2

(12) United States Patent
Piraube et al.

(10) Patent No.: US 10,543,578 B2
(45) Date of Patent: Jan. 28, 2020

(54) BLOCKING CALCULATION MODULE

(71) Applicant: Essilor International, Charenton-le-Pont (FR)

(72) Inventors: Sebastien Piraube, Paris (FR); Vincent Godot, Paris (FR)

(73) Assignee: Essilor International, Charenton-le-Pont (FR)

( * ) Notice: Subject to any disclaimer, the term of this patent is extended or adjusted under 35 U.S.C. 154(b) by 213 days.

(21) Appl. No.: 14/787,838

(22) PCT Filed: Apr. 16, 2014

(86) PCT No.: PCT/EP2014/057780
§ 371 (c)(1),
(2) Date: Oct. 29, 2015

(87) PCT Pub. No.: WO2014/177388
PCT Pub. Date: Nov. 6, 2014

(65) Prior Publication Data
US 2016/0074985 A1    Mar. 17, 2016

(30) Foreign Application Priority Data
Apr. 29, 2013   (EP) ..................................... 13305563

(51) Int. Cl.
B24B 13/005   (2006.01)
G05B 19/04    (2006.01)
(52) U.S. Cl.
CPC .......... B24B 13/0055 (2013.01); G05B 19/04 (2013.01); *G05B 2219/23012* (2013.01)

(58) Field of Classification Search
CPC ... B24B 13/0055; B24B 13/005; G05B 19/04; G05B 2219/23012
See application file for complete search history.

(56) References Cited

U.S. PATENT DOCUMENTS

2008/0051017 A1*  2/2008  Jiang ....................... B24B 9/146
                                                   451/384
2010/0228375 A1*  9/2010  Brechemier ............ B24B 9/146
                                                   700/110
(Continued)

FOREIGN PATENT DOCUMENTS

CN       101292189 A     10/2008
CN       102307704 A      1/2012
(Continued)

OTHER PUBLICATIONS

International Search Report dated Mar. 6, 2014; PCT International Application No. PCT/EP2014/057780.

*Primary Examiner* — Nathan L Laughlin
(74) *Attorney, Agent, or Firm* — Oblon, McClelland, Maier & Neustadt, L.L.P.

(57) ABSTRACT

The invention proposes a blocking calculation module (1) configured to calculate blocking data of an ophthalmic lens member (2) on a blocking element (3) of a blocking station (4), comprising:—receiving means (11) configured to receive input data from a remote device, the input data comprising optical data related to the ophthalmic lens member,—calculation means (15) configured to calculate the blocking data from the input data, and—transmitting means (17) configured to make the blocking data available to the blocking station.

13 Claims, 3 Drawing Sheets

(56) References Cited

U.S. PATENT DOCUMENTS

| | | | |
|---|---|---|---|
| 2011/0067628 A1* | 3/2011 | Savoie | B24B 13/005 |
| | | | 118/500 |
| 2011/0256804 A1* | 10/2011 | Lemaire | B24B 9/14 |
| | | | 451/5 |
| 2011/0257930 A1* | 10/2011 | Gourraud | B24B 13/005 |
| | | | 702/150 |
| 2013/0190919 A1* | 7/2013 | Nauche | B24B 9/146 |
| | | | 700/159 |
| 2014/0302749 A1* | 10/2014 | Samukawa | G05B 19/19 |
| | | | 451/5 |

FOREIGN PATENT DOCUMENTS

| | | | |
|---|---|---|---|
| EP | 2059367 A1 | | 5/2009 |
| EP | 2199021 A1 | | 6/2010 |
| JP | 2003287720 A | | 10/2003 |
| WO | WO 2012/049377 | * | 4/2012 |
| WO | 2008022978 A1 | | 1/2013 |

\* cited by examiner

BLOCKING CALCULATION MODULE

The invention relates to a blocking calculation module configured to calculate blocking data of an ophthalmic lens member on a blocking element of a blocking station.

The discussion of the background of the invention herein is included to explain the context of the invention. This is not to be taken as an admission that any of the material referred to was published, known or part of the common general knowledge at the priority date of any of the claims.

Ophthalmic lens is commonly used for correcting many different types of vision deficiencies of a wearer of the ophthalmic lens. These include defects such as near-sightedness (myopia) and far-sightedness (hypermetropia), astigmatism, and defects in near-range vision usually associated with aging (presbyopia).

An ophthalmic lens is typically made of plastic material and generally has two opposing surfaces which co-operate with one another to provide a required refractive property, generally corresponding to the wearer's prescription.

Currently, for providing an ophthalmic lens, an eye care practitioner orders the ophthalmic lens at an ophthalmic lab by sending an order request to the ophthalmic lab. The order request comprises wearer data, for example the wearer's prescription, and optionally other wearer's parameters, such as a head/eye movement coordination parameter and/or an eye rotation center. The order request further comprises spectacle frame data, for example the type of spectacle frame the wearer has selected, and lens data, for example the type of ophthalmic lens the wearer has selected.

The ophthalmic lab receives the order request and sends it to an ophthalmic lens designer. The lens designer uses the data comprised in the order request to calculate an ophthalmic lens design, by using an ophthalmic lens calculator. The ophthalmic lens design comprises optical data of the ophthalmic lens to be provided to the wearer, and manufacturing process data related to the manufacturing process of the ophthalmic lens.

The ophthalmic design determined by the lens designer is sent to the ophthalmic lab and the ophthalmic lens is manufactured based on the calculated design. The manufacturing process may for instance comprise a blocking step, a surfacing step, a polishing step and a marking step.

The current ophthalmic lens providing process presents some drawbacks.

Firstly, each ophthalmic lab has its own management entity, and its own apparatus and tools, in particular its own blocking elements and its own blocking station. Consequently, each lens designer has to be adapted to calculate manufacturing process data for the different ophthalmic labs.

This may be achieved by using, in the ophthalmic lens calculator, a database containing ophthalmic labs data related to the different labs. However, some labs data may not be obtained or updated, and this may result in performing a manufacturing process based on incorrect calculated manufacturing process data.

In a similar way, each ophthalmic lab has to be adapted to perform a manufacturing process based on manufacturing process data calculated by different lens designers. In particular, some lens designer calculators are configured to compute all the necessary information (optical information and manufacturing information) to manufacture an ophthalmic lens in a single calculation, while other lens designer calculators are mainly focused on optical calculations, and not as much on how to manufacture the design.

Secondly, the manufacturing process data are calculated prior to the beginning of the manufacturing process, and it is not possible to recalculate some of the manufacturing process data during the manufacturing process, for example to update the manufacturing process data based on measured process data. This may result in a lack of precision.

One object of the invention is to provide a blocking calculation module that does not present the drawbacks mentioned hereinabove.

To this end, the invention proposes a blocking calculation module configured to calculate blocking data of an ophthalmic lens member on a blocking element of a blocking station, comprising:

receiving means configured to receive input data from a remote device, the input data comprising optical data related to the ophthalmic lens member, the optical data comprising geometrical data representing a surface of the ophthalmic lens member to be placed on the blocking element, calculation means configured to calculate the blocking data from the input data, the blocking data comprising data related to a position of the ophthalmic lens member on the blocking element, and transmitting means configured to make the blocking data available to the blocking station.

According to an embodiment of the invention, the blocking element comprises a blocking ring, and the blocking calculation module comprises blocking ring selection means configured to select a blocking ring to be used among a predetermined set of available blocking rings. According to this embodiment of the invention, the calculation means are configured to calculate the blocking data from the input data and the selected blocking ring.

The calculation means may further be configured to calculate, from the blocking data, manufacturing data to be used for post-blocking manufacturing calculation. In this case, the transmitting means are configured to make the manufacturing data available to the post-blocking manufacturing calculation system.

The post-blocking manufacturing calculation may for example comprise surfacing calculation, polishing calculation and/or marking calculation.

The calculated blocking data may further comprise data related to a blocking material quantity to be used during the blocking process.

The blocking calculation module may further comprise blocking reference element selection means configured to select a blocking reference element to be used from the calculated blocking material quantity, among a predetermined set of available blocking reference elements.

According to an embodiment of the invention, the transmitting means are further configured to transmit data related to the selected blocking ring, and to the selected blocking reference element, to a management entity.

The blocking data may be calculated from configuration data including blocking location data, blocking orientation data, cribbing location data, blocking axis data, ring selection data, blocking reference element selection data, prism management data, and/or equipment capability related data.

According to an embodiment of the invention, the blocking calculation module comprises a human-computer interface configured to allow a user to set the configuration data.

According to another embodiment of the invention, the input data comprise the configuration data.

The invention further proposes a blocking calculation method for calculating blocking data of an ophthalmic lens member on a blocking element of a blocking station, comprising:

a receiving step during which input data are received from a remote device, the input data comprising optical data related to the ophthalmic lens member, the optical data comprising geometrical data representing a surface of the ophthalmic lens member to be placed on the blocking element, a calculation step during which the blocking data are calculated from the input data, the blocking data comprising data related to a position of the ophthalmic lens member on the blocking element, and a transmission step during which the blocking data are made available to the blocking station.

The input data may comprise calculated data and/or measured data.

The method may further comprise a second calculation step during which the blocking data are recalculated from updated input data received from a management entity.

The invention further proposes a computer program product comprising one or more stored sequences of instructions that are accessible to a processor and which, when executed by the processor, causes the processor to carry out the steps of the method.

The invention further proposes a computer readable medium carrying one or more sequences of instructions of the computer program product.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Non limiting embodiments of the invention will now be described with reference to the accompanying drawing wherein.

Elements in the Figures are illustrated for simplicity and clarity and have not necessarily been drawn to scale. For example, the dimensions of some of the elements in the figures may be exaggerated relative to other elements to help improve the understanding of the embodiments of the present invention.

Figure 1:
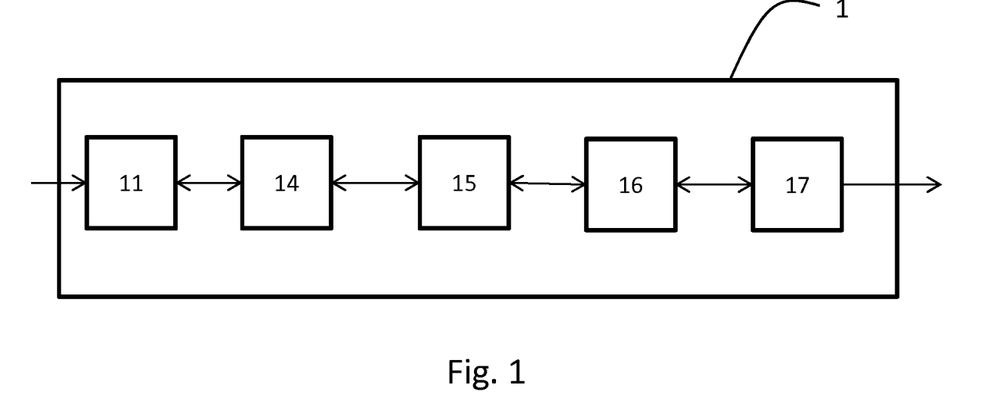
FIG. 1 is a functional view of a blocking calculation module according to an embodiment of the invention.

FIG. 1 shows a blocking calculation module 1 according to an embodiment of the invention.

Figure 2:
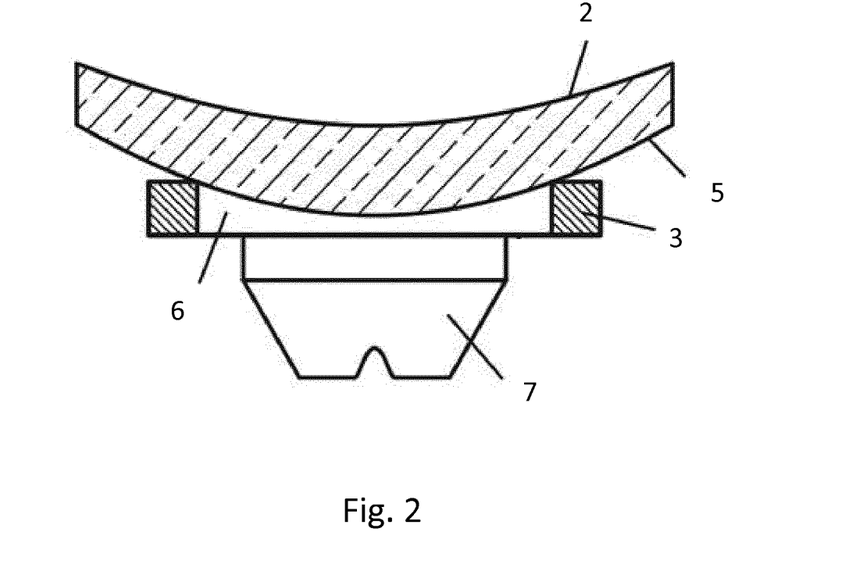
FIG. 2 is a cross-section view of an optical lens member having a surface placed on a blocking ring according to an embodiment of the invention.
Figure 3:
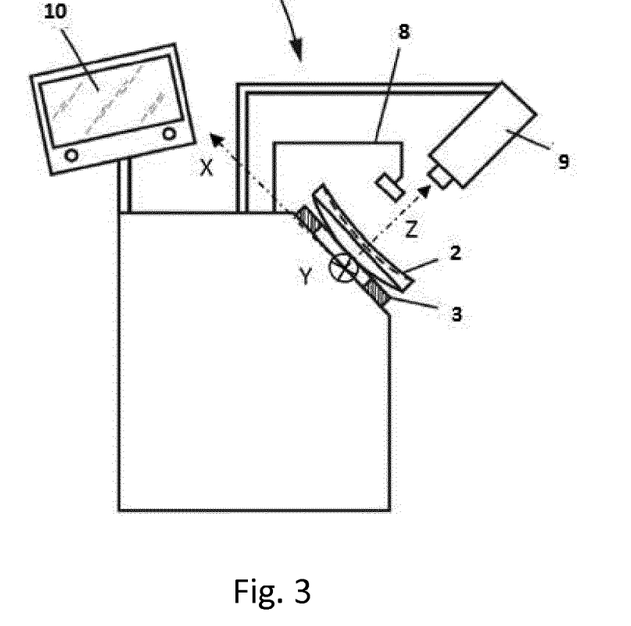
FIG. 3 is schematic view of an optical lens member on a blocking station.

The blocking calculation module 1 is configured to calculate blocking data of an ophthalmic lens member 2 (FIG. 2) on a blocking element 3 of a blocking station (FIG. 3).

In the context of the present invention, the term "ophthalmic lens member" can refer to a lens blank, an uncut lens, or a semi-finished lens.

The blocking calculation module 1 is associated to the manufacturing side. It may be arranged for instance in the ophthalmic lab comprising the blocking station 4.

According to the embodiment of the invention represented in FIG. 2, the blocking element is a blocking ring 3. During the ophthalmic lens member blocking step, a first surface 5 of the lens member 2 is placed on the lens blocking ring 3.

According to an embodiment of the invention, a blocking material, for instance an alloy, is poured in the cavity 6 defined by the first surface 5, the lens blocking ring 3 and a top surface (not represented) of blocking reference element 7. In the represented embodiment, the blocking reference element is an insert 7.

According to another embodiment of the invention, the blocking material is replaced by creating a vacuum between the lens member 2 and the blocking reference element 7, as disclosed in the document EP 2059367.

A predetermined set of blocking rings and/or a predetermined set of blocking reference elements may be available in the lab.

It has to be noted that other types of blocking elements may be used instead of a blocking ring. For instance, the blocking element may be a polymeric glue. A positioning arm may be used to position the lens member 2 on the polymeric glue.

As illustrated in FIG. 3, the blocking station 4 comprises a clamping arm 8 which may be moved from a free position to a clamping position in which it holds the lens member 2 in place on the lens blocking ring 3. The blocking station 4 may also include a digital camera 9 for taking an image of the positioning of the lens member 2 on the blocking ring 3, and a screen 10 for viewing the image from the digital camera 9. The lens member 2 may also be directly viewed by an operator without using the digital camera 9. Once the operator has positioned the lens member 2 in a predetermined position on the blocking ring 3, the optical lens 2 is clamped using the clamping arm 8. The blocking material may then be poured in the cavity 6. So as to place the lens member 2 in a predetermined position, the operator uses the digital camera 9 and the screen 10 to visualize reference markings on the first surface 5 of the lens member 2. The image of the reference markings on the first surface 5 of the lens member 2 is compared to a computer generated target on the screen 10. The operator places the lens member 2 so that the image of the reference markings of the first surface 5 of the lens member 2 and the computer generated target superpose.

The blocking data calculated by the module 1 aim at allowing the positioning of the ophthalmic lens member 2 on the blocking element 3 of the blocking station 4.

The module 1 comprises receiving means 11 configured to receive input data from a remote device. The input data may comprise calculated data and/or measured data. The input data comprise optical data related to the ophthalmic lens member 2. The optical data comprise geometrical data representing the surface 5 of the ophthalmic lens member 2 to be placed on the blocking element 3.

The optical data are generally calculated by an ophthalmic lens calculator 12 (FIG. 4) belonging to an ophthalmic lens designer. The optical data are calculated in response to the reception of an order request.

The order request comprises at least prescription data of the wearer of the ophthalmic lens 2. The prescription data comprise a set of optical characteristics such as spherical power, cylindrical power, cylinder axis, addition power, and prescribed prism, determined by an ophthalmologist in order to correct the vision defects of the wearer.

The order request may further comprise other wearer's parameters, such as a head/eye movement coordination parameter and/or an eye rotation center.

The geometrical data may comprise data related to a front surface of the ophthalmic lens 2, data related to a back surface of the ophthalmic lens 2, data related to a relative position of the front and back surfaces, and/or data related to a shape of the ophthalmic lens 2.

Figure 4:
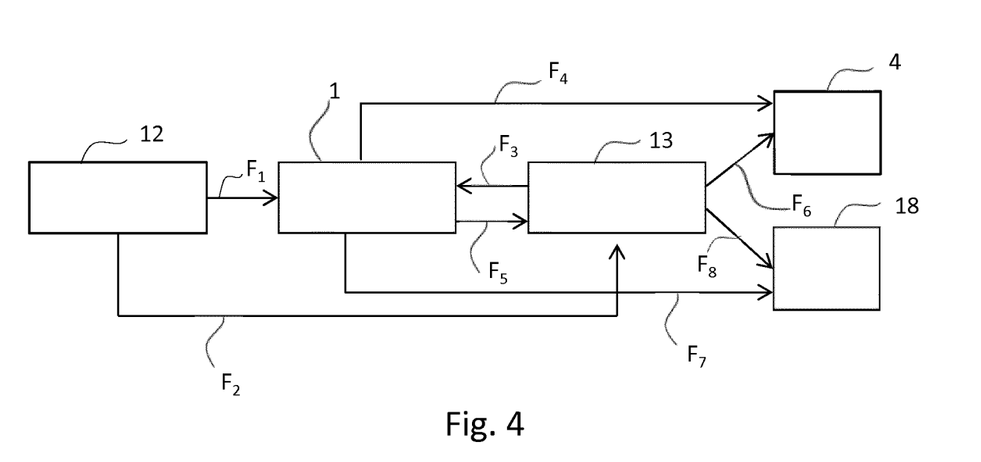
FIG. 4 is a functional view of a lens providing system comprising the blocking calculation module of FIG. 1.

According to an embodiment of the invention, the input data are received directly from the ophthalmic lens calculator 12, as symbolized by the arrow $F_1$.

According to another embodiment of the invention, the ophthalmic lens calculator 12 transmits the calculated optical data to a management entity 13, as symbolized by the arrow $F_2$. The input data are then received from the management entity 13, as symbolized by the arrow $F_3$.

According to another embodiment of the invention, not represented, the ophthalmic lens calculator 12 transmits the calculated optical data to another device connected to the module 1, for instance a master calculation module, which transmits the input data to the module 1.

When the lab comprises a predetermined set of available blocking rings, the blocking calculation module 1 may comprise blocking ring selection means 14 configured to select a blocking ring to be used among the predetermined set of available blocking rings.

The module 1 further comprises calculation means 15 configured to calculate the blocking data from the input data.

When the module 1 comprises blocking ring selection means 14, the blocking data may be calculated from the input data and the selected blocking ring.

The blocking data comprises data related to a position of the ophthalmic lens member 2 on the blocking element 3.

When a blocking material has to be used, the calculated blocking data may further comprise data related to a blocking material quantity to be used during the blocking process. The blocking material may be an alloy. The blocking material quantity may refer to a blocking material thickness.

When the lab comprises a predetermined set of blocking reference elements, the blocking calculation module 1 may further comprise blocking reference element selection means 16 configured to select a blocking reference element to be used from the calculated blocking material quantity, among the predetermined set of available blocking reference elements.

The module 1 further comprises transmitting means 17 configured to make the blocking data available to the blocking station 4.

The blocking data may be made available by transmitting the blocking data to the blocking station 4, directly, as symbolized by the arrow $F_4$, or via the management entity 13, as symbolized by the arrows $F_5$ and $F_6$.

Alternatively, the blocking data may be made available by storing the blocking data in the module 1 or in another device connected to the blocking station 4. In this alternative, an indication that the blocking data are available may be sent to the blocking station 4, directly or via the management entity 13.

The transmitting means 17 may be further configured to transmit data related to the selected blocking ring 3, and to the selected blocking reference element 7, to the management entity 13.

According to an embodiment of the invention, the blocking data are further calculated from configuration data. The configuration data may include blocking location data, blocking orientation data, cribbing location data, blocking axis data, ring selection data, blocking reference element selection data, prism management data, and/or equipment capability related data.

The blocking location data refer to a blocking location of at least a point of the lens member 2 on the blocking ring 3. The blocking orientation data refer to a blocking orientation of the lens member 2 relative to the blocking ring 3. The cribbing location data refer to a location of cribbing. The blocking axis data refer to a blocking axis of the blocking station 4. The ring selection data refer to a preselected ring. The blocking reference element selection data refer to a preselected blocking reference element, for instance to a preselected insert. The prism management data refer to management rules of the prism. The equipment capability related data refer to information regarding the capability and/or operation state of the equipment.

The configuration data may be set by a user, by using a human-computer interface provided in the module 1. Alternatively, the configuration data may be included in the input data received from the remote device.

According to an embodiment of the invention, the calculation means 15 are further configured to calculate, from the blocking data, manufacturing data to be used for post-blocking manufacturing calculation.

The post-blocking manufacturing calculation may comprise surfacing calculation, polishing calculation and/or marking calculation.

The manufacturing data associated with each equipment must be calculated in chronological order because of the dependencies of certain process steps on the previous. For example, the generating, polishing and engraving steps depend on how the lens was blocked (e.g. initial and final thicknesses, orientation of the lens member). This implies that the blocking parameters must be calculated first in order to calculate the remaining steps of the process.

When post-blocking manufacturing data are calculated, the transmitting means 17 are configured to make the manufacturing data available to a post-blocking manufacturing calculation system 18.

The post-blocking manufacturing calculation system 18 may comprise one or several manufacturing calculation module(s).

The manufacturing data may be made available by transmitting the manufacturing data to the post-blocking manufacturing calculation system 18, directly, as symbolized by the arrow $F_7$, or via the management entity 13, as symbolized by the arrows $F_5$ and $F_8$.

Alternatively, the manufacturing data may be made available by storing the manufacturing data in the module 1 or in another device connected to the post-blocking manufacturing calculation system 18. In this alternative, an indication that the manufacturing data are available may be sent to the post-blocking manufacturing calculation system 18.

The blocking calculation module 1 disclosed above is associated to a lab instead of being associated to a calculator. Consequently, the blocking calculation module 1 is able to manufacture an ophthalmic lens 2 independently of the location and the origin of the optical data, and is able to calculate all manufacturing parameters on the fly for any products, and any processes.

Figure 5:
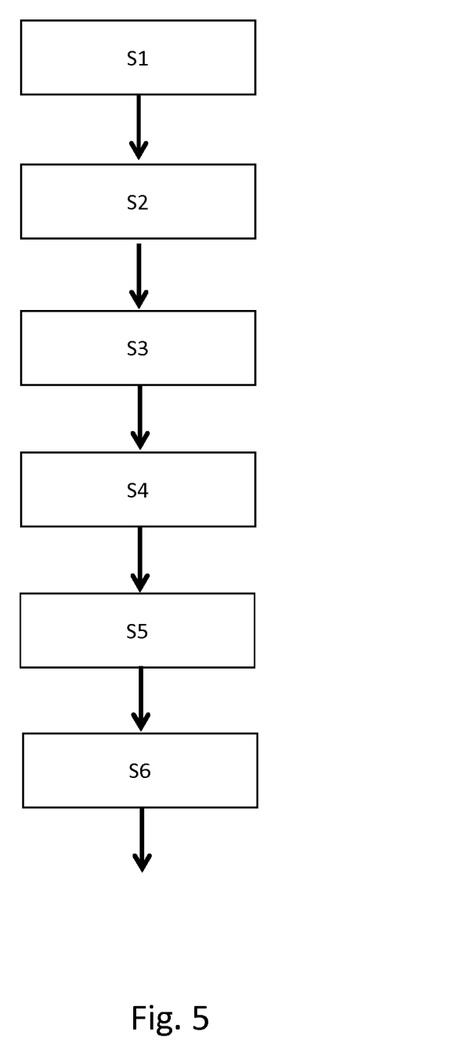
FIG. 5 is a flow chart showing steps of a blocking calculation method according to an embodiment of the invention.

FIG. 5 represents a blocking calculation method according to an embodiment of the invention, in which the method comprises:
- a receiving step S1,
- a blocking ring selection step S2,
- a blocking data calculation step S3,
- a blocking reference element selection step S4,
- a transmission step S5, and
- a second calculation step S6.

During the receiving step S1, input data are received from a remote device. The input data comprise optical data related to the ophthalmic lens member. The optical data comprise geometrical data representing the surface 5 of the ophthalmic lens member 2 to be placed on the blocking element 3.

The input data may comprise calculated data and/or measured data.

During the optional blocking ring selection step S2, a blocking ring to be used is selected among a set of blocking rings available in the lab.

During the calculation step S3, the blocking data are calculated from the input data and the selected blocking ring 3. The blocking data comprise data related to a position of the ophthalmic lens member 2 on the blocking ring 3, and optionally data related to a blocking material quantity to be used.

During the optional blocking reference element selection step S4, a blocking reference element to be used is selected from the blocking material quantity, among a predetermined set of available blocking reference elements.

During the transmission step S5, the blocking data and the selected blocking ring and blocking reference element are made available to the blocking station 4.

During the second calculation step S6, the blocking data are recalculated from updated input data received from the management entity 13 or from the blocking station 4. The updated input data may for instance comprise blocking position error data measured after the blocking step of the lens member 2, measured prism deviation, or measured blocking material thickness error. The blocking data dependent of the measured data may thus be recalculated from the actual measured data. For instance, the blocking data dependent of the blocking position, such as the blocking material quantity, may thus be recalculated from the actual position data. The second calculation step S6 is similar to the calculation step S3, but is performed based on updated input data.

Figure 6:
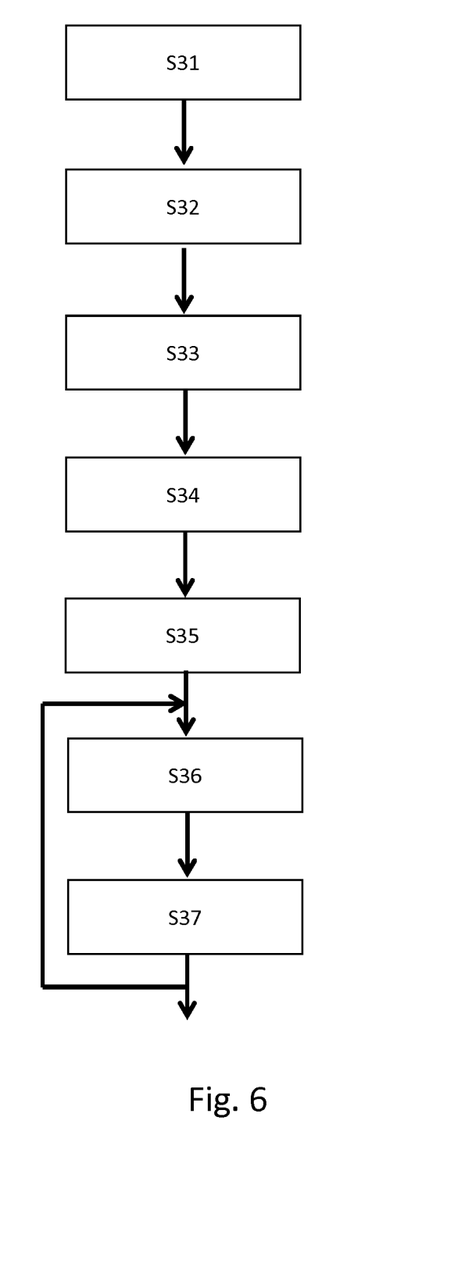
FIG. 6 is a flow chart showing operations of the blocking data calculation step of the blocking calculation method, according to an embodiment of the invention.

FIG. 6 represents the blocking data calculation step S3 according to an embodiment of the invention. This calculation is described in details in the document EP12306717.5. The step S3 comprises:
- a reference system providing operation S31,
- a blocking ring data providing operation S32,
- an optical lens member surface data providing operation S33,
- a position parameters providing operation S34,
- an initial position determining operation S35,
- a repositioning operation S36, and
- an altitude determination operation S37.

During the reference system providing operation S31, a reference system is provided. The reference system comprises a main axis Z perpendicular to a main plane defined by two axes X, Y perpendicular to each other and to the main axis Z.

During the blocking ring data providing operation S32, blocking ring data are provided. The blocking ring data represent, in the reference system, a plurality of at least three points of the bearing zone.

During the optical lens member surface data providing operation S33, data related to the optical lens member surface 5 are provided. The optical lens member surface data represent, in the reference system, the surface 5 of the optical lens member 2 to be placed on the blocking ring 3.

During the position parameters providing operation S34, position parameters are provided. The position parameters define a position of a reference point of the placed surface 5 with respect to the main plane X-Y of the reference system and an orientation, about the main axis Z of the placed surface at the reference point.

During the initial position determining operation S35, the position of the placed surface 5 of the optical lens member 2 is determined according to the position parameters.

During the repositioning operation S36, the placed surface 5 is virtually translated along the main axis Z and rotated about the two perpendicular axes X, Y, from the initial position, to be set in a virtual position.

During the altitude determination operation S37, a difference in position along the main axis Z between each of the points of the blocking ring data and the placed surface 5 of the optical lens member 2 in said virtual position is determined.

The repositioning and altitude determining operations S36 and S37 are repeated so as to minimizing the difference in position along the main axis Z between the points of the blocking ring data and the placed surface 5 of the optical lens member 2 and by imposing that for each point of the blocking ring data, the distance in position along the main axis Z with the placed surface 5 of the optical lens member 2 is greater than or equal to zero for determining complementary position parameters of the optical lens member 2.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A system comprising:
an apparatus having memory and a processor, wherein the memory is configured to store sequences of instructions that are accessible to the processor and which, when executed by the processor, cause the processor to perform a blocking calculation process that is configured to calculate blocking data of an ophthalmic lens member on a blocking element of a blocking station, the blocking calculation process causing the processor to:
receive input data from a remote device, the input data comprising optical data related to the ophthalmic lens member, the optical data comprising geometrical data representing a surface of the ophthalmic lens member to be placed on the blocking element,
calculate the blocking data from the input data, the blocking data comprising data related to a position of the ophthalmic lens member on the blocking element,
transmit the blocking data to the blocking station,
calculate post-blocking manufacturing data to manufacture an ophthalmic lens from the ophthalmic lens member based at least in part on the blocking data, wherein the blocking station manufactures the ophthalmic lens based on the calculated post-blocking manufacturing data, and
transmit the post-blocking manufacturing data to a post-blocking manufacturing calculation system, wherein
a post-blocking manufacturing calculation of the post-blocking manufacturing calculation system comprises a surfacing calculation, a polishing calculation, and a marking calculation.

2. The system according to claim 1, wherein
the blocking element comprises a blocking ring, and wherein the blocking calculation process further comprises selecting a blocking ring to be used among a predetermined set of available blocking rings, and calculating the blocking data from the input data and the selected blocking ring.

3. The system according to claim 1, wherein
the calculated blocking data further comprise data related to a blocking material quantity to be used during the blocking process.

4. The system according to claim 3, wherein
the blocking calculation process further comprises selecting a blocking reference element to be used from the calculated blocking material quantity, among a predetermined set of available blocking reference elements.

5. The system according to claim 2, wherein
the blocking calculation process further comprises transmitting data related to the selected blocking ring and the selected blocking reference element to a management entity.

6. The system according to claim 5, wherein
the blocking data are further calculated from configuration data including blocking location data, blocking orientation data, cribbing location data, blocking axis data, ring selection data, blocking reference element selection data, prism management data, and/or equipment capability related data.

7. The system according to claim 6, wherein
the blocking calculation process is further configured to allow a user to set the configuration data.

8. The system according to claim 6, wherein
the input data comprise the configuration data.

9. A method of manufacturing an ophthalmic lens and calculating blocking data of an ophthalmic lens member on a blocking element of a blocking station, comprising:
receiving input data from a remote device, the input data comprising optical data related to the ophthalmic lens member, the optical data comprising geometrical data representing a surface of the ophthalmic lens member to be placed on the blocking element;
calculating the blocking data from the input data, the blocking data comprising data related to a position of the ophthalmic lens member on the blocking element;
transmitting the blocking to the blocking station;
calculating post-blocking manufacturing data to manufacture an ophthalmic lens from the ophthalmic lens member based at least in part on the blocking data;
manufacturing the ophthalmic lens at the blocking station based on the calculated post blocking manufacturing data, and
transmitting the post-blocking manufacturing data to a post-blocking manufacturing calculation system, wherein
a post-blocking manufacturing calculation of the post-blocking manufacturing calculation system comprises a surfacing calculation, a polishing calculation, and a marking calculation.

10. The method according to claim 9, wherein
the input data comprise at least one of calculated data and measured data.

11. The method according to claim 10, further comprising performing a second calculation during which the blocking data are recalculated from updated input data received from a management entity.

12. A manufacturing apparatus comprising:
a processor;
a non-transitory computer readable medium comprising one or more stored sequences of instructions that are accessible to the processor and which, when executed by the processor, cause the processor to:
receive input data from a remote device, the input data comprising optical data related to an ophthalmic lens member, the optical data comprising geometrical data representing a surface of the ophthalmic lens member to be placed on a blocking element of a blocking station,
calculate the blocking data from the input data, the blocking data comprising data related to a position of the ophthalmic lens member on the blocking element,
transmit the blocking data to the blocking station,
calculate post-blocking manufacturing data to manufacture an ophthalmic lens from the ophthalmic lens member based at least in part on the blocking data, wherein the blocking station manufactures the ophthalmic lens based on the calculated post-blocking manufacturing data, and
transmit the post-blocking manufacturing data to a post-blocking manufacturing calculation system, wherein a post-blocking manufacturing calculation of the post-blocking manufacturing calculation system comprises a surfacing calculation, a polishing calculation, and a marking calculation.

13. The apparatus according to claim 12, wherein the processor is further configured to recalculate the blocking data from updated input data received from a management entity.

\* \* \* \* \*